United States Patent
Silva et al.

(10) Patent No.: US 11,499,756 B2
(45) Date of Patent: Nov. 15, 2022

(54) MODULAR WATERSIDE ECONOMIZER FOR AIR-COOLED CHILLERS

(71) Applicant: Carrier Corporation, Palm Beach Gardens, FL (US)

(72) Inventors: Frank Silva, Huntersville, NC (US); Biswajit Mitra, Huntersville, NC (US); Richard G Lord, Murfreesboro, TN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 140 days.

(21) Appl. No.: 16/603,463

(22) PCT Filed: Apr. 5, 2018

(86) PCT No.: PCT/US2018/026257
§ 371 (c)(1),
(2) Date: Oct. 7, 2019

(87) PCT Pub. No.: WO2018/187570
PCT Pub. Date: Oct. 11, 2018

(65) Prior Publication Data
US 2021/0088260 A1    Mar. 25, 2021

Related U.S. Application Data

(60) Provisional application No. 62/482,809, filed on Apr. 7, 2017.

(51) Int. Cl.
*F24F 5/00* (2006.01)
*F25B 49/02* (2006.01)
*F25B 1/10* (2006.01)

(52) U.S. Cl.
CPC .............. *F25B 1/10* (2013.01); *F24F 5/0035* (2013.01); *F25B 49/02* (2013.01);
(Continued)

(58) Field of Classification Search
CPC ...... F25B 1/10; F25B 5/00; F25B 5/02; F25B 5/04; F25B 49/02; F25B 2400/13; F25B 2600/0253; F25B 2600/2509; F24F 5/0035

See application file for complete search history.

(56) References Cited

U.S. PATENT DOCUMENTS 8,151,578 B1    4/2012  Morales et al.
8,209,993 B2    7/2012  Carlson et al.
(Continued)

FOREIGN PATENT DOCUMENTS

CN    1975287 A      6/2007
CN    110462300 A    11/2019
(Continued)

OTHER PUBLICATIONS

Grenbäck, Mattias; International Search Report; PCT/US2018/026257; 6 pages; dated Jun. 28, 2018.
(Continued)

*Primary Examiner* — Miguel A Diaz
(74) *Attorney, Agent, or Firm* — Cantor Colburn LLP

(57) ABSTRACT

A hydronic economizer module configured for use in a chiller system having a vapor compression cycle including a housing having at least a first air inlet. A heat exchanger assembly located within said housing. The heat exchanger includes at least one heat exchanger coil. A fan assembly includes at least one fan generally aligned with the at least one heat exchanger coil. At least one valve is movable between a plurality of positions to control a flow of fluid into said heat exchanger assembly. When said at least one valve is in a first position the economizer module is arranged in parallel with a component of the vapor compression cycle. When said at least one valve is in a second position the
(Continued)

economizer module is arranged in series with said component of the vapor compression cycle.

19 Claims, 6 Drawing Sheets

(52) U.S. Cl.
CPC ... *F25B 2400/13* (2013.01); *F25B 2600/0253* (2013.01); *F25B 2600/2509* (2013.01)

(56) References Cited

U.S. PATENT DOCUMENTS

| | | | |
|---|---|---|---|
| 8,406,929 B2 | 3/2013 | Duncan | |
| 8,590,333 B2 | 11/2013 | Carlson et al. | |
| 8,635,881 B2 | 1/2014 | Carlson et al. | |
| 8,974,274 B2 | 3/2015 | Carlson | |
| 9,091,496 B2 | 7/2015 | Imwalle et al. | |
| 9,278,303 B1 | 3/2016 | Somani et al. | |
| 9,313,929 B1 | 4/2016 | Malone et al. | |
| 9,338,928 B2 | 5/2016 | Lehman | |
| 9,382,817 B2 | 7/2016 | Somani et al. | |
| 9,476,657 B1* | 10/2016 | Pettis | F28F 27/02 |
| 9,491,892 B1 | 11/2016 | Carlson et al. | |
| 10,119,717 B2* | 11/2018 | Matsuo | F24F 3/06 |
| 10,215,470 B2* | 2/2019 | Nikaido | F25B 13/00 |
| 2006/0225444 A1 | 10/2006 | Taras et al. | |
| 2006/0266074 A1 | 11/2006 | Groll et al. | |
| 2009/0112522 A1 | 4/2009 | Rasmussen | |
| 2009/0126399 A1* | 5/2009 | Takegami | F25B 47/022 62/510 |
| 2009/0301123 A1 | 12/2009 | Monk et al. | |
| 2011/0023514 A1 | 2/2011 | Mitra et al. | |
| 2011/0192188 A1 | 8/2011 | Nickey et al. | |
| 2011/0225997 A1 | 9/2011 | Gast, Jr. et al. | |
| 2014/0029196 A1 | 1/2014 | Smith | |
| 2014/0096547 A1* | 4/2014 | Boehde | F24F 1/50 62/89 |
| 2014/0202177 A1* | 7/2014 | Rush | F24F 3/06 62/56 |
| 2014/0298834 A1 | 10/2014 | Gast, Jr. et al. | |
| 2014/0338391 A1* | 11/2014 | Keisling | F25B 25/00 62/513 |
| 2015/0285539 A1 | 10/2015 | Kopko | |
| 2015/0354849 A1* | 12/2015 | Matsuo | F24F 11/72 62/181 |
| 2016/0209087 A1* | 7/2016 | Reytblat | F28C 1/16 |
| 2016/0305702 A1* | 10/2016 | Nikaido | F25B 25/005 |
| 2017/0082370 A1* | 3/2017 | Strumenti | F28C 3/08 |
| 2017/0227263 A1* | 8/2017 | Kopko | F25B 25/005 |
| 2017/0268792 A1* | 9/2017 | Costakis | F24F 5/001 |
| 2019/0301819 A1* | 10/2019 | Nagata | F28F 17/00 |
| 2020/0309433 A1* | 10/2020 | Wang | F25B 6/00 |
| 2021/0088260 A1* | 3/2021 | Silva | F25B 1/10 |

FOREIGN PATENT DOCUMENTS

| | | |
|---|---|---|
| EP | 2233863 A2 | 9/2010 |
| JP | H04103930 A | 4/1992 |
| RU | 2151809 C1 | 6/2000 |
| TW | I435033 B | 4/2014 |
| WO | 2016025739 A1 | 2/2016 |

OTHER PUBLICATIONS

Examination Report under Sections 12 & 13 of the Patents Act; Indian Application No. 201917038907; International Filing Date: Sep. 26, 2019; dated Oct. 6, 2020; 6 pages.

Chinese Office Action; International Application No. 201880023811.X; International Filing Date: Oct. 8, 2019; dated Nov. 4, 2020; 5 pages.

Hanson, Susanna et al. "'Free' Cooling Using Water Economizers", Trane Engineers Newsletter; vol. 37-3, pp. 1-7; www.trane.com/Commercial/Uploads/PDF/11598/News-%20Free%20Cooling%20using%20Water%20Economizers.pdf; Date Accessed: Nov. 17, 2020.

International Search Report of the International Searching Authority; International Application No. PCT/US2018/026257; International Fling Date: Apr. 5, 2018; dated Jun. 28, 2018; 6 pages.

Written Opinion of the International Searching Authority; International Application No. PCT/US2018/026257; International Filing Date: Apr. 5, 2018; dated Jun. 28, 2018; 7 pages.

RU Office Action (Substantive Examination) with English Translation; RU Application No. 2019131870/12(062731); dated Aug. 2, 2021; pp. 1-18.

European Office Action; European Application No. 18720706.3; dated Apr. 26, 2022; 6 pages.

* cited by examiner

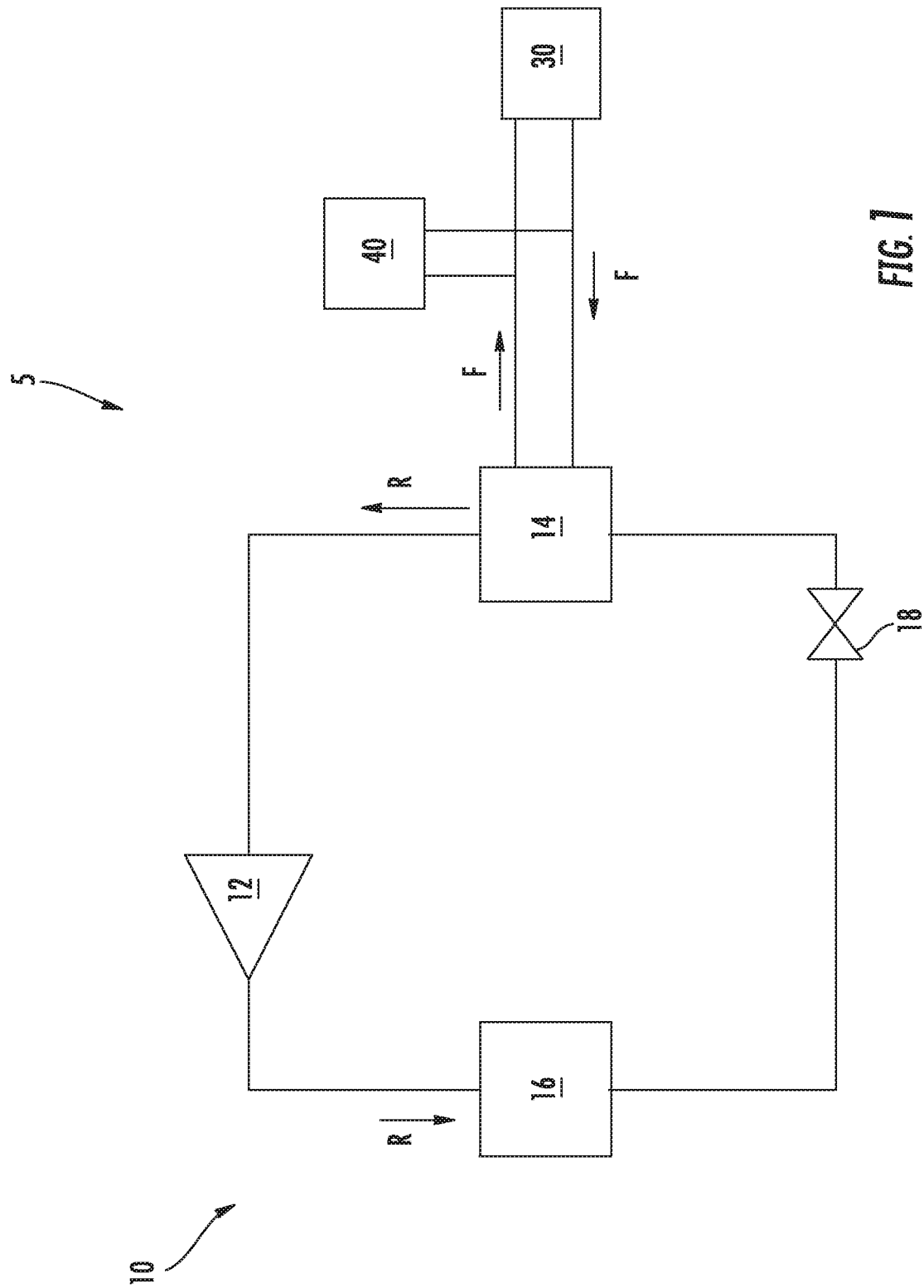

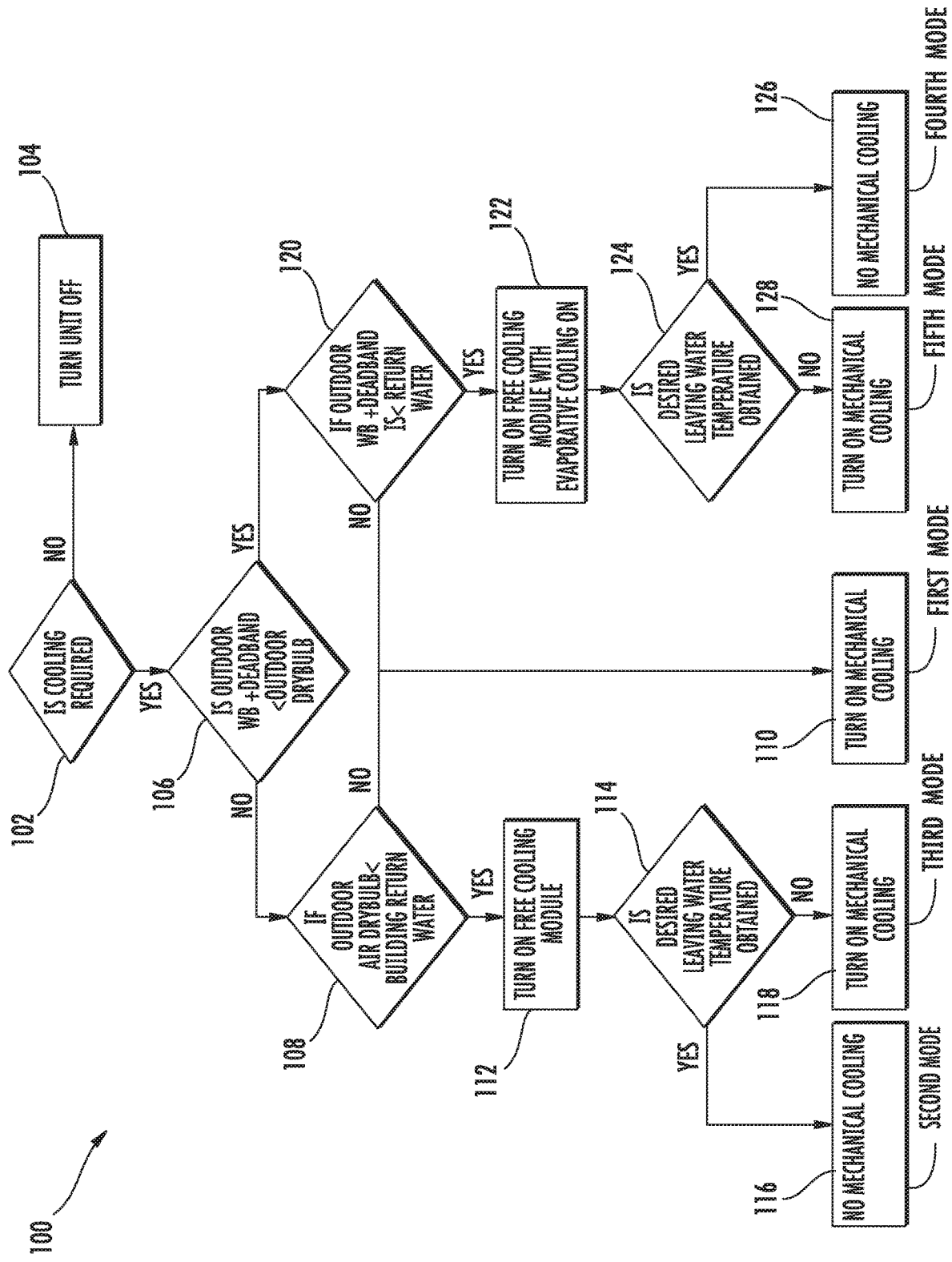

MODULAR WATERSIDE ECONOMIZER FOR AIR-COOLED CHILLERS

CROSS-REFERENCE TO RELATED APPLICATIONS

This application is a 371 U.S. National Stage application of PCT/US2018/026257, filed Apr. 5, 2018, which claims the benefit of U.S. Provisional Application No. 62/482,809, filed Apr. 7, 2017, both of which are incorporated by reference in their entirety herein.

BACKGROUND

Embodiments of this disclosure relate generally to chilled refrigeration systems and, more particularly, to a hydronic free cooling economizer for use with a chilled fluid refrigeration system.

Chilled fluid systems provide a temperature conditioned fluid, for use in conditioning the air within large buildings and other facilities. The chilled fluid is typically pumped to a number of remote heat exchangers or system coils for cooling various rooms or areas within a building. A chilled fluid system enables the centralization of the air conditioning requirements for a large building or complex of buildings by using water or a similar fluid as a safe and inexpensive temperature transport medium.

In general, a chilled fluid system is configured to provide chilled fluid at a particular temperature, via a first fluid loop, for cooling and dehumidify air in a building. Heat and moisture are extracted from the building air, and the heat is transferred to the fluid in the first fluid loop, and is returned via the first fluid loop to the chilled fluid system. The returned fluid is again cooled to the desired temperature by transferring the heat of the fluid to the chillers refrigerant. After the refrigerant is compressed by a compressor, the heat in the refrigerant is transported to the condenser. Some units use a water cooled condenser where heat is transferred to a second fluid, such as water for example. The second fluid loop transports waste heat from the condenser of the chiller to a cooling tower which then transfers the waste heat from the second water loop to ambient air by direct contact and evaporation of some of the water between the ambient air and the second fluid of the second loop. However, other chilled fluid systems transfer the heat directly to the air using fans and condenser coils.

Recent modifications to the ASHRAE 90.1-2013 and 2016 efficiency standard require such systems to include an air or waterside economizer which can provide additional cooling to the first fluid loop without the use of a refrigerant based chiller when the ambient temperatures is below a certain level. There is therefore an opportunity to develop an economizer operable to serve several key markets.

SUMMARY

According to a first embodiment, a hydronic economizer module configured for use in a chiller system having a vapor compression cycle including a housing having at least a first air inlet. A heat exchanger assembly located within said housing. The heat exchanger includes at least one heat exchanger coil. A fan assembly includes at least one fan generally aligned with the at least one heat exchanger coil. At least one valve is movable between a plurality of positions to control a flow of fluid into said heat exchanger assembly. When said at least one valve is in a first position the economizer module is arranged in parallel with a component of the vapor compression cycle. When said at least one valve is in a second position the economizer module is arranged in series with said component of the vapor compression cycle.

In addition to one or more of the features described above, or as an alternative, in further embodiments said at least one heat exchanger assembly includes at least one first heat exchanger coil and at least one second heat exchanger coil.

In addition to one or more of the features described above, or as an alternative, in further embodiments said at least one first heat exchanger coil is mounted to a longitudinal sidewall of said housing and said at least one second heat exchanger coil is mounted to a second longitudinal sidewall of said housing.

In addition to one or more of the features described above, or as an alternative, in further embodiments said fan assembly is arranged in a blow-through configuration.

In addition to one or more of the features described above, or as an alternative, in further embodiments said fan assembly is arranged in a draw-through configuration.

In addition to one or more of the features described above, or as an alternative, in further embodiments said fan assembly is mounted to a top surface of the housing.

In addition to one or more of the features described above, or as an alternative, in further embodiments said fan assembly includes a first fan generally aligned with said at least one first heat exchanger coil and a second fan generally aligned with said at least one second heat exchanger coil.

In addition to one or more of the features described above, or as an alternative, in further embodiments said at least one fan is a fixed speed fan.

In addition to one or more of the features described above, or as an alternative, in further embodiments said at least one fan is a variable speed fan.

In addition to one or more of the features described above, or as an alternative, in further embodiments at least one of said at least one first heat exchanger coil and said at least one second heat exchanger coil includes one of a V-shaped configuration, an A-shaped configuration, a U-shaped configuration, and a substantially horizontal configuration.

In addition to one or more of the features described above, or as an alternative, in further embodiments comprising a plurality of spray nozzles operable to lower a wet bulb temperature of said economizer module.

In addition to one or more of the features described above, or as an alternative, in further embodiments said plurality of spray nozzles is positioned generally upstream from said heat exchanger assembly relative to a flow of air through the economizer module.

According to another embodiment, an economizer configured for use in a chiller system having a vapor compression cycle including a plurality of economizer modules. Each economizer module includes a housing having at least a first air inlet. A heat exchanger assembly located within the housing includes at least one heat exchanger coil. A fan assembly includes at least one fan generally aligned with the at least one heat exchanger coil. At least one valve is movable between a plurality of positions to control a flow of fluid into the heat exchanger assembly. When the at least one valve is in a first position the economizer module is arranged in parallel with a component of the vapor compression cycle and when said at least one valve is in a second position the economizer module is arranged in series with said component of the vapor compression cycle.

In addition to one or more of the features described above, or as an alternative, in further embodiments the plurality of economizer modules are substantially identical.

In addition to one or more of the features described above, or as an alternative, in further embodiments said plurality of economizer modules are arranged in series.

According to another embodiment, a method of operating a chiller system having an economizer includes sensing an ambient air temperature and controlling at least one valve of the economizer such that the chiller system is operated in one of a first mode, a second mode, and a third mode. In the first mode, a fluid is cooled via a heat exchange relationship with an evaporator. In the second mode the fluid is cooled within the economizer via a heat exchange relationship with ambient air. In the third mode the fluid is partially cooled within the economizer and the fluid is partially cooled with the evaporator.

In addition to one or more of the features described above, or as an alternative, in further embodiments reducing the ambient air temperature to about a wet bulb temperature when the chiller system is operating in one of the second mode and the third mode.

In addition to one or more of the features described above, or as an alternative, in further embodiments reducing the ambient air temperature to about a wet bulb temperature includes selectively operating a plurality of spray nozzles.

In addition to one or more of the features described above, or as an alternative, in further embodiments selectively operating the plurality of spray nozzles includes generating a mist downstream from a heat exchanger coil of the economizer relative to a flow of ambient air there through.

According to yet another embodiment, a controller of a chiller system including an economizer including at least one valve operably coupled to the chiller system. A method of operation of the controller comprises receiving a signal indicating an ambient air temperature and controlling the at least one valve of the economizer to select a mode of operation of the chiller system from a plurality of modes of operation. In a first mode of the plurality of modes, a fluid is cooled via a heat exchange relationship with an evaporator. In a second mode of the plurality of modes the fluid is cooled within the economizer via a heat exchange relationship with ambient air. In a third mode of the plurality of modes the fluid is partially cooled within the economizer and the fluid is partially cooled with the evaporator.

BRIEF DESCRIPTION OF THE DRAWINGS

The subject matter, which is regarded as the present disclosure, is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is a schematic diagram of an example of a chiller refrigeration system including a waterside economizer;

FIG. 5 is a flow diagram of a method of determining an operational mode of the chiller system according to an embodiment.

Figure 1A:
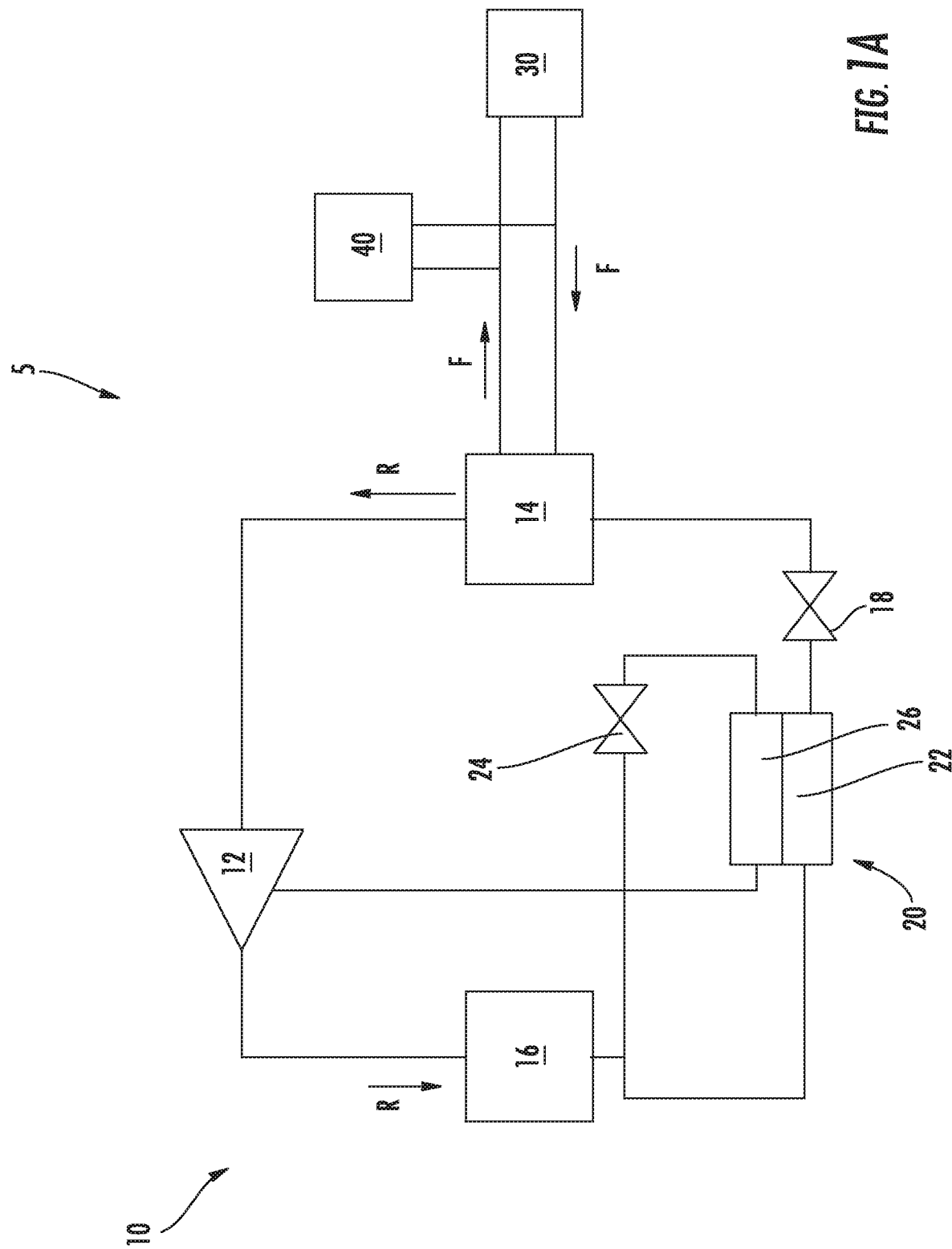
FIG. 1A is a schematic diagram of another example of a chiller refrigeration system including a waterside economizer and a refrigerant economizer.

The detailed description explains embodiments of the present disclosure, together with advantages and features, by way of example with reference to the drawings.

DETAILED DESCRIPTION

Referring now to FIG. 1, a schematic diagram of a chiller system 5 is illustrated. The chiller system includes a conventional vapor compression or refrigeration cycle 10. A refrigerant fluid, such as R-410A or R-134a (R) for example, is configured to circulate through the vapor compression cycle 10 such that the refrigerant R absorbs heat when evaporated at a low temperature and pressure and releases heat when condensed at a higher temperature and pressure. Within this cycle 10, the refrigerant R flows in a counterclockwise direction as indicated by the arrows. The compressor 12 receives refrigerant vapor from the evaporator 14 and compresses it to a higher temperature and pressure, with the relatively hot vapor then passing to the condenser 16 where it is cooled and condensed to a liquid state by a heat exchange relationship with a cooling medium such as air or water. In a basic vapor compression cycle 10, the liquid refrigerant R then passes from the condenser 16 to an expansion valve 18, wherein the refrigerant R is expanded to a low temperature two phase liquid/vapor state as it passes to the evaporator 14. After the addition of heat in the evaporator, low pressure vapor then returns to the compressor 12 where the cycle is repeated.

In the illustrated, non-limiting embodiment of FIG. 1A, the vapor compression cycle 10 additionally includes a refrigerant economizer heat exchanger 20 arranged downstream from the condenser 16. In such embodiments, the refrigerant R output from the condenser 16 is split between two fluid flow paths. A first portion of the refrigerant R, flows through one or more passes 22 of the economizer heat exchanger 20 before being supplied to the expansion valve 18. A second portion of the refrigerant passes through a valve 24 before being provided to one or more passes 26 of the economizer heat exchanger 20. The distinct flows of refrigerant R are arranged in a heat exchange relationship within the economizer heat exchanger 20. By cooling the refrigerant R in the second flow path, inclusion of the economizer heat exchanger 20 further cools the refrigerant R provided to the expansion valve 18. The refrigerant in the second flow path absorbs heat from the first refrigerant flow path and becomes a vapor. This vapor is then provided directly to an intermediate portion of the compressor 12, thereby bypassing the expansion valve 18 and evaporator 14 of the system 10. Inclusion of the economizer heat exchanger 20 increases the overall efficiency of the vapor compression cycle 10. However, it should be understood that vapor compression systems that do not include an economizer heat exchanger 20 or have another configuration are also contemplated herein.

The chiller system 5 additionally includes a secondary system 30, such as an air handler for example, fluidly coupled to the vapor compression cycle 10 of the chiller. As shown, a fluid F, such as water for example, is provided from the secondary system 30 to the evaporator 14. Within the evaporator 14, heat is rejected from the fluid F to the refrigerant R, such that a cool fluid F is returned to the secondary system 30. Within the secondary system 30, the fluid F may be circulated to a building or conditioned space to cool and dehumidify air associated therewith.

To improve the overall efficiency of both the vapor compression cycle 10 and the secondary system 30, a hydronic or fluid economizer 40 may be connected to the fluid circuit extending between the vapor compression cycle 10 and the secondary system 30. The economizer 40 may be used in place of, or in addition to the evaporator 14, to cool the fluid F. Fluid or hydronic economizers 40 are typically located exterior to a building to allow for cooling of the fluid F using ambient air. As a result, inclusion of the fluid economizer 40 may be particularly beneficial in cooler climates where the ambient temperature is sufficient to cool the fluid F.

Figure 2:
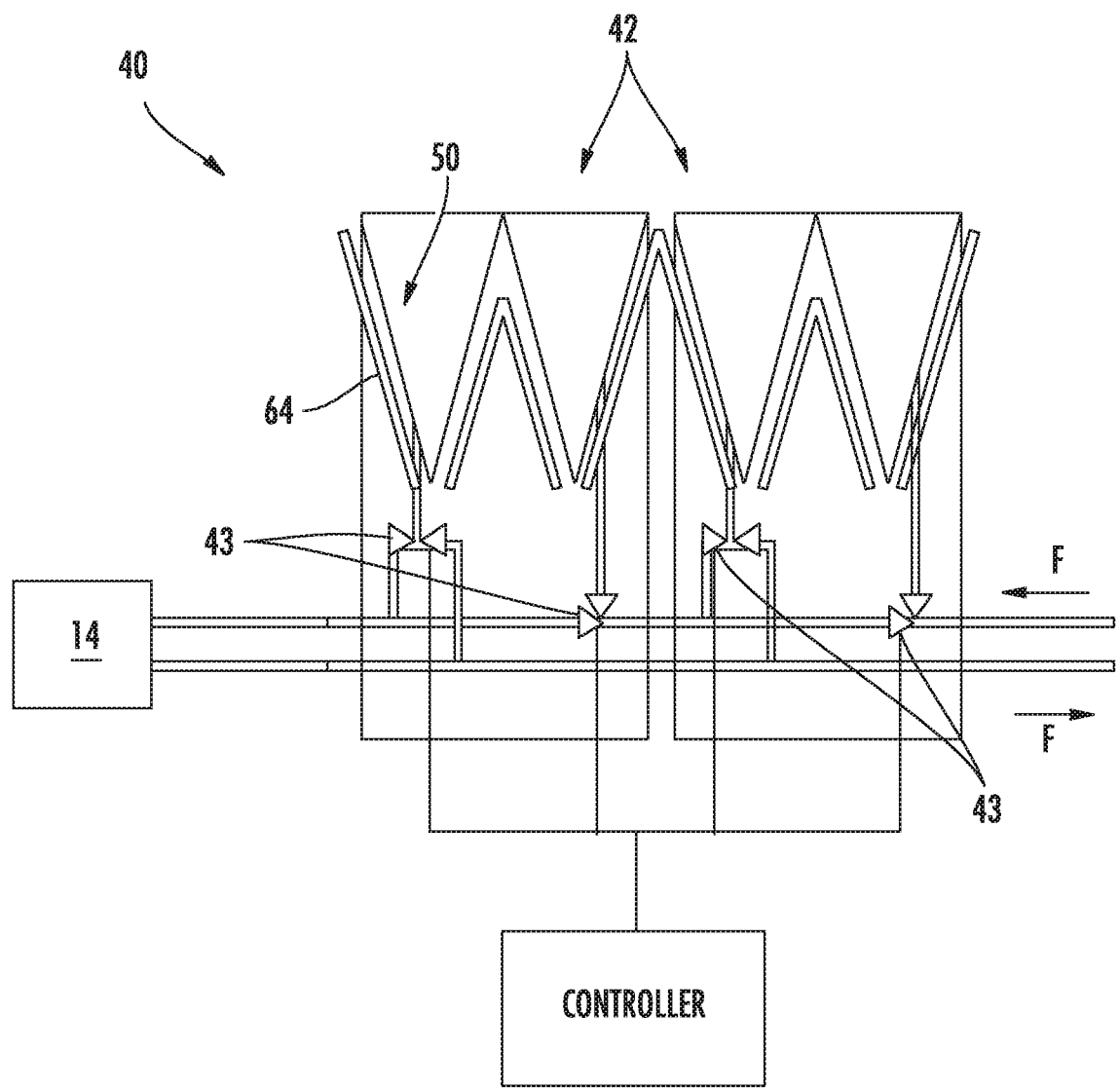
FIG. 2 is a schematic diagram of a waterside economizer according to an embodiment.

Referring now to FIG. 2, an example of the fluid economizer 40 used in conjunction with the vapor compression cycle 10 and the secondary system 30 is illustrated in more detail. The fluid economizer 40 includes one or more economizer modules 42 arranged generally adjacent one another, such as in stacked alignment for example. In embodiments where the fluid economizer 40 includes a plurality of modules 42, the modules 42 may have a similar configuration, or alternatively, may have distinct configurations. Any number of economizer modules 42 may be included such that the heat exchange capacity of the plurality of modules 42 is sufficient to meet the cooling requirements for a given application. Each economizer module 42 is arranged in fluid communication with an inlet conduit and includes a valve 43, such as a three way valve for example, to selectively control a flow of fluid F to the module 42. The valves 43 are operable such that the modules 42 may be arranged in series or in parallel with the evaporator 14. In embodiments where the fluid economizer 40 includes a plurality of modules 42, the fluid F is configured to flow through the plurality of modules 42 in parallel. Alternatively, the fluid F may be configured to flow through all or at least a portion of the plurality of modules 42 in series.

Figure 3:
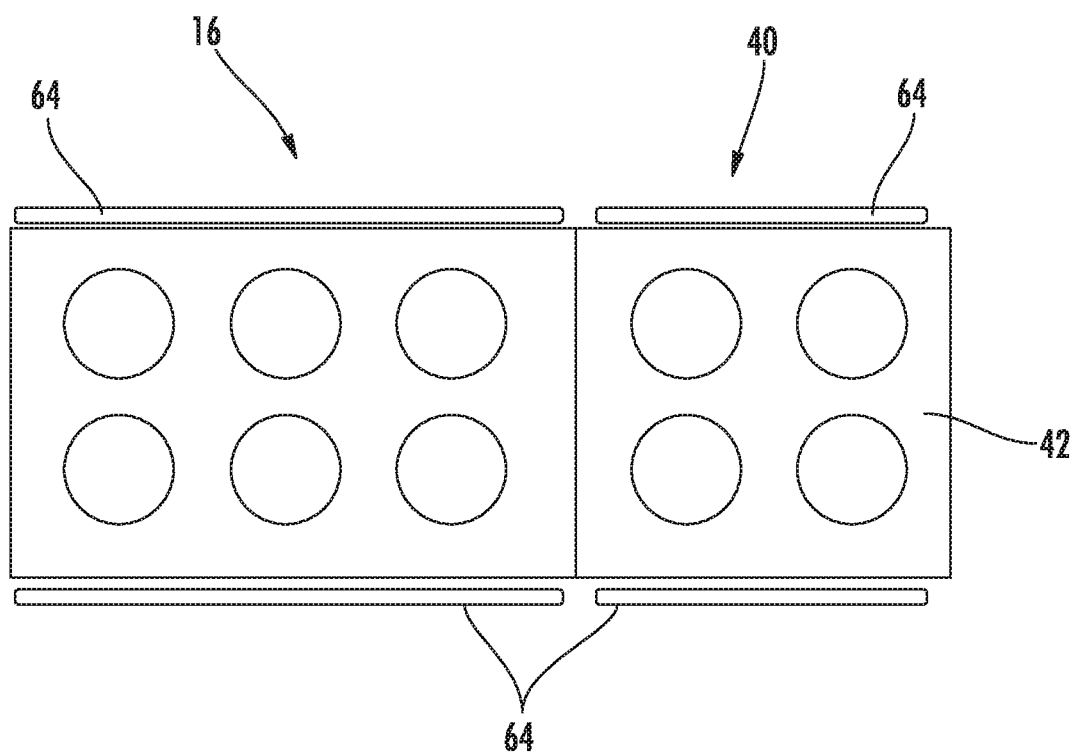
FIG. 3 is a top view of a waterside economizer and a condenser of a chiller refrigeration system according to an embodiment.

With reference to FIG. 3, in an embodiment, the one or more modules 42 of the fluid economizer 40 may be generally aligned with the one or more coils of the condenser unit 16 of the vapor compression system 10. Because the fluid economizer 40 is arranged in parallel with the condenser coils 16, relative to the airflow, inclusion of the economizer modules 42 does not increase the airside pressure drop, resulting in a higher efficiency.

Figure 4:
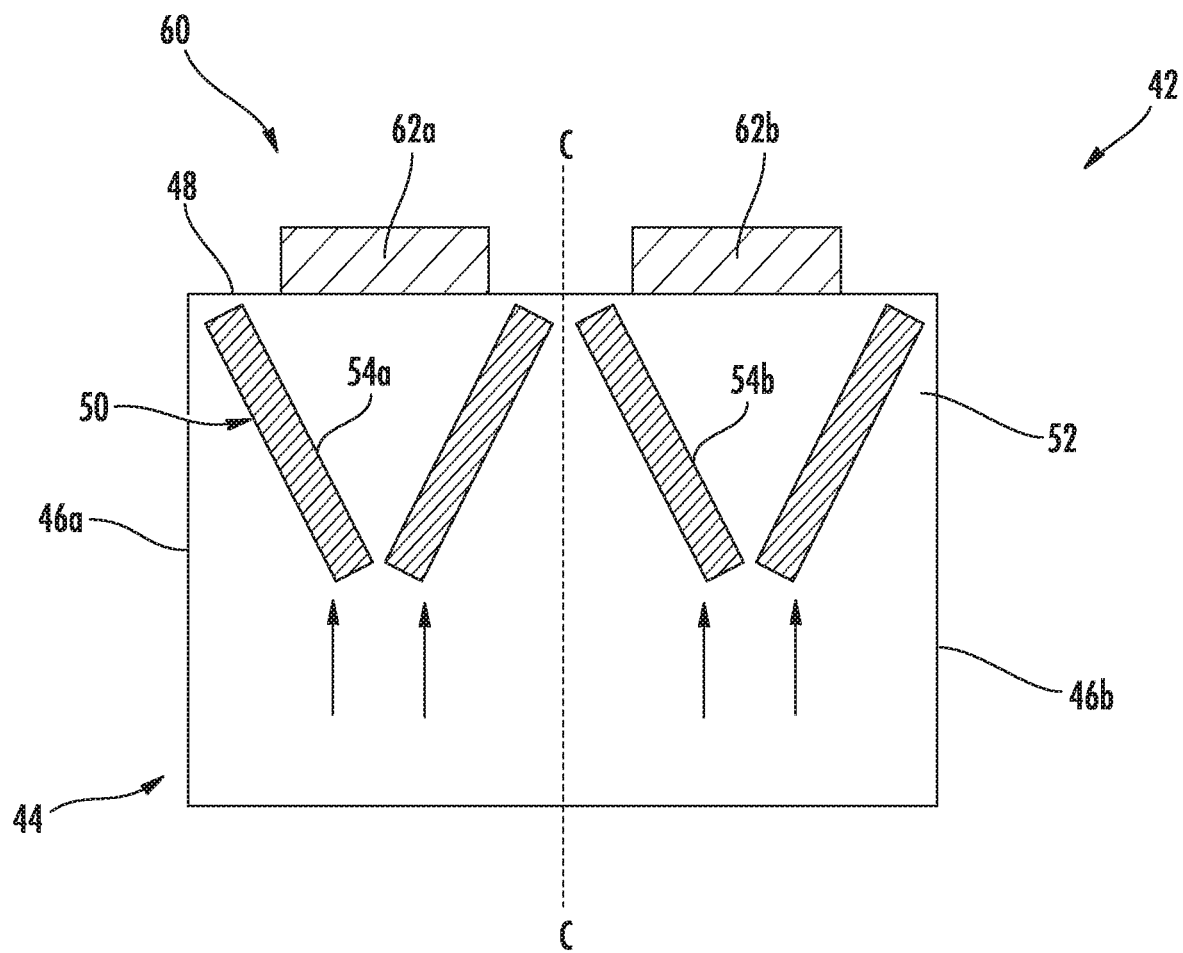
FIG. 4 is a cross-sectional view of an example of a typical water economizer module of the economizer according to an embodiment.

With reference now to FIG. 4, an example of a hydronic fluid economizer module 42 is illustrated in more detail. Each economizer module 42 includes a housing or cabinet 44. One or more sides 46a, 46b of the housing 44 define an inlet for air to flow into the economizer module 42. Similarly, an end 48 of the housing 44 defines an outlet opening for air to exit from the economizer module 42. Located within the housing 44 of each economizer module 42 is a heat exchanger assembly 50 arranged between the opposing longitudinal sides 46a, 46b. The cross-section of the heat exchanger assembly 50 is generally constant over a length of the economizer module 42, such as between a front surface 52 and a back surface (not shown) for example. The heat exchanger assembly 50 includes at least one heat exchanger coil 54a, 54b, for example a round tube plate fin heat exchanger coil formed having copper coils and aluminum fins. In embodiments where the heat exchanger assembly 50 includes a plurality of heat exchanger coils 54a, 54b, the heat exchanger coils 54a, 54b may, but need not be, arranged generally symmetrically or equidistantly spaced from a center of the economizer module 42 between the opposing longitudinal sides 46a, 46b, as illustrated schematically by line C.

In the illustrated, non-limiting embodiment, the heat exchanger assembly 50 includes at least a first heat exchanger coil 54a mounted to the first longitudinal side 46a of the housing 44 and at least a second, heat exchanger coil 54b mounted to the second longitudinal side 46b of the housing 44. The first heat exchanger coil 54a and the second heat exchanger coil 54b may, but need not be, substantially identical. The plurality of heat exchanger coils 54a, 54b may be arranged within the housing 44 such that at least a portion of the heat exchanger assembly 50 has a generally V-shaped configuration, as is known in the art. In the illustrated, non-limiting embodiment, the at least one first heat exchanger coil 54a includes a pair of heat exchanger coils arranged in a V-shaped configuration and the at least one second heat exchanger coil 54b includes a pair of heat exchanger coils arranged in a V-shaped configuration. However, alternative configurations of the heat exchanger assembly 50, such as the generally W-shaped configuration, an A-shaped configuration, or a generally horizontal configuration for example, are also within the scope of the disclosure.

The economizer module 42 additionally includes a fan assembly 60 including one or more fans 62a, 62b configured to circulate air through the housing 44 and the heat exchanger assembly 50. Depending on the characteristics of the economizer module 42, the fan assembly 60 may be positioned either downstream with respect to the heat exchanger assembly 50 (i.e. "draw through configuration") as shown in the FIG. 4, or upstream with respect to the heat exchanger assembly 50 (i.e. "blow through configuration"). In the draw-through configuration, as shown, the fan assembly 60 may be mounted at the first end 48 of the housing 44. In an embodiment, the fan assembly 60 includes a plurality of fans 62a, 62b substantially equal to the plurality of heat exchanger coils 54a, 54b in the heat exchanger assembly 50. In such embodiments, each fan 62a, 62b is configured to draw air through a respective heat exchanger coil 54a, 54b, and is generally vertically aligned with that coil 54a, 54b, respectively. However, embodiments where the fan assembly 60 includes only a single fan 62, two fans 62, or where the total number of fans 62 is different than the number of heat exchanger coils 54 are also contemplated herein. In addition, the one or more fans 62 of the fan assembly 60 may be configured as fixed speed fans, or alternatively, may have a variable speed capability.

Operation of the at least one fan 62 associated with the at least one heat exchanger coil 54 causes air to flow through an adjacent air inlet and into the housing 44 of the economizer module 42. As the air passes over the heat exchanger coil 54, heat transfers from the fluid F inside the coil 54 to the air, thereby cooling the fluid F and causing the temperature of the air to increase. The warm air is then exhausted from the from module 42, and the cooler fluid F is returned to the fluid circuit where it is either further cooled, or returned to the secondary system 30.

With reference again to FIG. 2, in an embodiment, each economizer module 42 may additionally include a plurality of water spray nozzles 64, also referred to as evaporative pre-coolers, substantially aligned with the plurality to coils 54 of the heat exchanger assembly 50. These added water spray nozzles 64 are operable to enhance the free cooling coils 54 by allowing the air temperature within a corresponding economizer module 42 to be reduced through the evaporation of water. This evaporation of water can lower the air temperature closer to the ambient wetbulb temperature that in some dry climates can be as much as 40 F lower than the drybulb temperature. It should be understood that in an embodiment, the condenser 16 of the vapor compression system 10 may additionally include water spray nozzles 64 intended to enhance the operation thereof.

In an embodiment, the plurality of spray nozzles 64 are be formed in a grid and located directly upstream from the heat exchanger assembly 50 with respect to the flow of air through the module 42. The spray nozzles 64 are selectively operable to generate a mist adjacent the underside of the heat exchanger coils 54. The mist is configured to reduce the local ambient temperature surrounding the heat exchanger assembly 50 to a temperature close to the wet bulb temperature and facilitate evaporative cooling. Accordingly, operation of the spray nozzles 64 changes the temperature and humidity of the air passing through the coils 54 without adding condensation thereto. In an embodiment, the spray nozzles 64 are operated only if two conditions are met. First, the wetbulb temperature must be less than the temperature of the fluid F by a predetermined amount and second, the wetbulb temperature must be less than the dry bulb temperature by a predetermined amount.

With reference again to FIG. 1, the vapor compression cycle and the waterside economizer 40 may be operated in a plurality of modes to cool the fluid F. The mode of operation may be determined based on a sensed ambient temperature. In a first, normal mode of operation, the valves 43 that control the flow of fluid to the economizer modules 42 are in a closed position. As a result, fluid F flows from the system 30 to the evaporator 14 of the vapor compression cycle 10 where it is mechanically cooled before being returned to the system 30. The system is operated in the first mode when the ambient temperature is substantially warmer than a predetermined threshold.

In a second, free cooling mode, the valves 43 are positioned to direct the entire fluid flow F into the one or more modules 42 of the fluid economizer 40. Within the heat exchanger assemblies 50 of each module, the fluid F is arranged in a heat exchange relationship with cool ambient air. The cooled fluid F is then returned directly to the system 30. Accordingly, in free-cooling mode, the evaporator 14 is not used to cool the fluid F. In such embodiments, the vapor compression cycle 10 need not be operational since all cooling is performed by the fluid economizer 40. In the second mode of operation, the ambient temperature is below the predetermined threshold such that the air ambient air alone is capable of cooling the fluid F. In a third pre-cooling mode of operation, the fluid F is provided to the fluid economizer 40 and then to the evaporator 14 in series. In an embodiment, the system is operated in a pre-cooling mode when the ambient temperature is too warm to fully cool the fluid F. It should be understood that the spray nozzles 64 may be used in either the second, free-cooling mode, or the third pre-cooling mode of operation.

Referring now to FIG. 5, and with continued reference to FIG. 1, an example of a method 100 for determining an operational mode of the chiller system is illustrated. As shown in block 102, a controller or processor (not shown) associated with the system is configured to determine whether cooling is required. If no cooling is required, the system is shut off as shown in block 104. If it is determined that cooling is required, the sum of the outdoor wetbulb temperature and the deadband temperature is compared to the outdoor drybulb temperature in block 106. If the sum of the outdoor wetbulb temperature and the deadband temperature is not less than the outdoor drybulb temperature, the outdoor wetbulb temperature is compared to the temperature of the fluid returned to the building at block 108. If the outdoor wetbulb temperature is not less the temperature of the fluid returned to the building, the system is operated in a first mode, shown in block 110, where mechanical cooling is performed by the evaporator 14 of the vapor compression system 10. However, if the outdoor wetbulb temperature is less the temperature of the fluid returned to the building, use of the fluid economizer 40, to at least partially cool the fluid is initiated, shown in block 112.

After initiation of the fluid economizer 40, in block 114, the temperature of the fluid output from the fluid economizer 40 is evaluated to determine whether it is less than or equal to a desired temperature. If the temperature of the fluid output is less than or equal to the desired temperature, then no additional mechanical cooling is necessary, and the system is operated in the second, free cooling mode, as shown in block 116. However, if the temperature of the fluid is greater than the desired temperature, as shown in block 118, the system is operated in a third mode where the evaporator 14 of the vapor compression system 10 is used in conjunction with the fluid economizer 40 to cool the water.

Returning again to block 106, if the sum of the outdoor wetbulb temperature and the deadband temperature is less than the outdoor drybulb temperature, the sum of the outdoor wetbulb temperature and the deadband temperature is then compared to the temperature of the returned fluid at block 120. If the sum of the outdoor wetbulb temperature and the deadband temperature is not less the temperature of the fluid returned, i.e. if the sum is greater than or equal to the temperature of the fluid returned, then the system is operated in the first mode, as shown in block 110. If the sum of the outdoor wetbulb temperature and the deadband temperature is less the temperature of the fluid returned to the building, operation of the economizer module 40 including evaporative cooling from the spray nozzles 64 is initiated in block 122.

To determine whether mechanical cooling is necessary to supplement the cooling from the fluid economizer 40, in block 124, the temperature of the fluid output from the fluid economizer 40 is evaluated to determine whether a desired temperature has been attained. If the desired temperature has been attained, then no additional mechanical cooling is necessary, and the system is operated in the fourth free cooling mode including evaporating cooling from the spray nozzles, as shown in block 126. However, if the temperature of the fluid is greater than the desired temperature, as shown in block 128, the system is operated in a fifth mode where the evaporator 14 of the vapor compression system 10 is used in conjunction with the economizer 40 and the spray nozzles 64 to cool the fluid.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A hydronic economizer module configured for use in a chiller system having a vapor compression cycle and a secondary system, the hydronic economizer module comprising:

a housing having at least a first air inlet;
a heat exchanger assembly located within said housing, including at least one heat exchanger coil;
a fan assembly including at least one fan generally aligned with said at least one heat exchanger coil; and
at least one valve movable between a plurality of positions to control a flow of fluid into said heat exchanger assembly,
wherein when said at least one valve is in a first position, the economizer module is arranged in parallel with a component of the vapor compression cycle,
when said at least one valve is in a second position, the economizer module is arranged in series with said component of the vapor compression cycle, and
when operating in a free-cooling mode of operation, the at least one valve is positioned such that a fluid output from the hydronic economizer module is provided directly to the secondary system.

2. The hydronic economizer module according to claim 1, wherein said at least one fan is a fixed speed fan.

3. The hydronic economizer module according to claim 1, wherein said at least one fan is a variable speed fan.

4. The hydronic economizer module according to claim 1, further comprising a plurality of spray nozzles operable to lower a wet bulb temperature of said economizer module.

5. The hydronic economizer module according to claim 4, wherein said plurality of spray nozzles is positioned generally upstream from said heat exchanger assembly relative to a flow of air through the economizer module.

6. The hydronic economizer module according to claim 1, wherein said at least one heat exchanger coil includes at least one first heat exchanger coil and at least one second heat exchanger coil.

7. The hydronic economizer module according to claim 6, wherein said at least one first heat exchanger coil is mounted to a longitudinal sidewall of said housing and said at least one second heat exchanger coil is mounted to a second longitudinal sidewall of said housing.

8. The hydronic economizer module according to claim 6, wherein said fan assembly is arranged in a blow-through configuration.

9. The hydronic economizer module according to claim 6, wherein at least one of said at least one first heat exchanger coil and said at least one second heat exchanger coil includes one of a V-shaped configuration, an A-shaped configuration, a U-shaped configuration, and a substantially horizontal configuration.

10. The hydronic economizer module according to claim 6, wherein said fan assembly is arranged in a draw-through configuration.

11. The hydronic economizer module according to claim 10, wherein said fan assembly is mounted to a top surface of the housing.

12. The hydronic economizer module according to claim 11, wherein said fan assembly includes a first fan generally aligned with said at least one first heat exchanger coil and a second fan generally aligned with said at least one second heat exchanger coil.

13. An economizer configured for use in a chiller system having a vapor compression cycle and a secondary system, the economizer comprising:
a plurality of economizer modules, each economizer module including:
a housing having at least a first air inlet;
a heat exchanger assembly located within said housing, including at least one heat exchanger coil;
a fan assembly including at least one fan generally aligned with said at least one heat exchanger coil; and
at least one valve movable between a plurality of positions to control a flow of fluid into said heat exchanger assembly,
wherein when said at least one valve is in a first position, the economizer module is arranged in parallel with a component of the vapor compression cycle,
when said at least one valve is in a second position, the economizer module is arranged in series with said component of the vapor compression cycle, and
when operating in a free-cooling mode of operation, the at least one valve is positioned such that a fluid output from the hydronic economizer module is provided directly to the secondary system.

14. The economizer according to claim 13, wherein the plurality of economizer modules are substantially identical.

15. The economizer according to claim 13, wherein said plurality of economizer modules are arranged in series.

16. A method of operating a chiller system having an economizer, comprising:
sensing an ambient air temperature; and
controlling at least one valve of the economizer such that the chiller system is selectively operated in a first mode, a second mode, and a third mode,
wherein in the first mode, a fluid is cooled via a heat exchange relationship with an evaporator;
wherein in the second mode, the fluid is cooled within the economizer via a heat exchange relationship with ambient air and the fluid bypasses the evaporator; and
wherein in the third mode, the fluid is partially cooled within the economizer and the fluid is partially cooled with the evaporator, the partial cooling within the economizer occurring in series with the partial cooling by the evaporator.

17. The method of claim 16, further comprising reducing the ambient air temperature to a wet bulb temperature when the chiller system is operating in one of the second mode and the third mode.

18. The method of claim 17, wherein reducing the ambient air temperature to a wet bulb temperature includes selectively operating a plurality of spray nozzles.

19. The method of claim 18, wherein selectively operating the plurality of spray nozzles includes generating a mist downstream from a heat exchanger coil of the economizer relative to a flow of ambient air therethrough.

* * * * *